United States Patent
Torbus et al.

(10) Patent No.: US 6,720,366 B1
(45) Date of Patent: Apr. 13, 2004

(54) BINDER SYSTEM ON THE BASIS OF POLYURETHANE FOR MOLDING MATERIAL MIXTURES FOR USE IN THE PRODUCTION OF CASTING MOLDS AND CORES

(75) Inventors: Marek Torbus, Krefeld (DE); Gérad Philippe Mario Ladegourdie, Düsseldorf (DE)

(73) Assignee: Huttenes-Albertus Chemische Werke GmbH (DE)

( * ) Notice: Subject to any disclaimer, the term of this patent is extended or adjusted under 35 U.S.C. 154(b) by 58 days.

(21) Appl. No.: 09/635,093

(22) Filed: Aug. 8, 2000

Related U.S. Application Data

(63) Continuation of application No. 08/742,945, filed on Oct. 31, 1996, now Pat. No. 6,136,888.

(30) Foreign Application Priority Data

Nov. 1, 1995 (DE) ......................................... 195 42 752
Mar. 15, 1996 (DE) ......................................... 196 12 017

(51) Int. Cl.$^7$ ................................................ B22C 1/22
(52) U.S. Cl. ...................................................... 523/142
(58) Field of Search .......................................... 523/142

(56) References Cited

U.S. PATENT DOCUMENTS 3,904,559 A * 9/1975 Furness ........................ 260/19
6,136,888 A * 10/2000 Torbus et al. ................ 523/142

* cited by examiner

Primary Examiner—Edward J. Cain
(74) Attorney, Agent, or Firm—Pendorf & Cutliff

(57) ABSTRACT

This invention describes the use of higher fatty acid methyl esters, i.e. of methyl monoesters of fatty acids having a carbon chain of 12 C atoms or more, for example of rapeseed oil methyl ester, as solvent for the individual or both components of polyurethane binders for molding materials used in foundry technology, the components of which comprise a phenolic resin which contains free OH groups and a polyisocyanate as a reaction participant. The fatty acid methyl esters can be the sole solvent. However, they also can be used, at least for the polyisocyanate, together with a high boiling aromatic hydrocarbon, whereby the amount of the fatty acid methyl ester should exceed the amount of the hydrocarbon, and they can be used, at least for the phenolic resin, together with a solvent of higher polarity.

The use of fatty acid methyl esters entails considerable benefits. In particular, the addition of high-boiling aromatic hydrocarbons which had so far been unavoidable is no longer necessary or can be minimized drastically.

2 Claims, No Drawings

BINDER SYSTEM ON THE BASIS OF POLYURETHANE FOR MOLDING MATERIAL MIXTURES FOR USE IN THE PRODUCTION OF CASTING MOLDS AND CORES

REFERENCE TO RELATED APPLICATIONS

This application is a continuation of application Ser. No. 08/742,945 filed Oct. 31, 1996 U.S. Pat. No. 6,136,888, allowed Jun. 23, 2000.

To produce casting molds and cores, frequently binder systems on the basis of polyurethane are used. These are two-component systems, one component of which consists of polyols with a minimum of two OH groups in the molecule and the other of polyisocyanates with a minimum of two NCO groups in the molecule. These two components, in dissolved form, are added to a basic granular molding material (in most cases sand) and are subjected to a curing reaction by adding a catalyst.

DESCRIPTION OF THE RELATED ART

In a typical example of such systems, the polyol is a precondensate of phenol or phenol compounds with aldehydes which contains free OH groups (hereinafter referred to as "phenolic resin"), and the polyisocyanate is an aromatic polyisocyanate, such as diphenylmethanediisocyanate. Tertiary amines are used as catalysts. Depending on whether the cold-box process or the nobake process is used, the catalyst, in combination with the remaining ingredients of the binder system, is added either immediately prior to processing the molding material mixture or after the molding material mixture, which is initially produced without catalyst, has been added into a mold in which the mixture is gassed with gaseous amine.

In this type of system, solvents are required to ensure that during mixing with the basic molding material, the components of the binding agent are maintained at a sufficiently low viscosity. This is particularly true with respect to phenolic resins which, due to their higher viscosity always require a solvent, but it also applies to polyisocyanates. One problem encountered in this context is that the two binder components require different types of solvents. Thus, as a rule, nonpolar solvents work well with polyisocyanates but are not readily compatible with phenolic resins, and the reverse applies to polar solvents. In practice, it is therefore common to use mixtures of polar and nonpolar solvents which are balanced specifically for the binder system used. In this context, it should be ensured that the boiling range of the individual components of this mixture is not too low so that the solvent does not turn prematurely ineffective due to evaporation.

The nonpolar solvents preferably used so far were high-boiling aromatic hydrocarbons (mainly in the form of mixtures) with a boiling range above approximately 150° C. at normal pressure, and the polar solvents used were, among other things, certain sufficiently high-boiling esters, such as the "symmetrical" esters described in the German Patent Specification No. 2,759,262, the acid residue and the alcohol residue of which contain a relatively large number of C atoms within the same range (approximately 6–13 atoms).

In spite of all the advantages of polyurethane binders for foundry technology, these binders have one serious drawback In that they are responsible for evaporations and the gas evolution in the working place, which, in most cases, cannot be prevented by protective measures, such as fume hoods, or similar devices. As a result of the fact that, in the meantime, it was possible to reduce the residual content of free formaldehyde and free phenol, the development in the area of resins has led to products which cause very low workplace exposure; and even with respect to the esters which, by nature, have a disagreeable smell, it has been possible to improve the situation markedly by the use of the symmetrical esters mentioned above, but what remains is the problem of exposure to the high-boiling aromatic hydrocarbons in the working place, which so far could not be dispensed with. These aromatic hydrocarbons are generally alkyl-substituted benzenes, toluenes, and xylenes. To ensure the highest possible boiling point, however, they may, in addition, also contain compounds with condensed benzene rings, i.e., naphthalene, etc., which are substances considered hazardous to human health and which are released not only after casting but already during the production of the molding material mixtures.

SUMMARY OF THE INVENTION

This problem is to be solved by this invention. Briefly, this is achieved according to this invention through the use of methyl esters of higher fatty acids as the solvent or solvent component for the individual or both components of the polyurethane binders. In this context, the term "methyl esters of higher fatty acids", hereinafter referred to as "fatty acid methyl esters", includes all monomethyl esters of fatty acids having a carbon chain of 12 C atoms or more. These methyl esters can be readily prepared by transesterification of fats and oil of vegetable of animal origin which are normally available in the form of triglycerides or can be prepared without problems by esterification of fatty acids obtained from such fats and oils.

Rapeseed oil methyl ester is a typical example of an ester on the basis of vegetable oils; it is a suitable solvent, particularly since it is available at low cost in the form of diesel fuel. But the methyl esters of other vegetable oils, such as soybean oil, linseed oil, sunflower oil, peanut oil, tung oil, palm kernel oil, coconut oil, castor oil and/or olive oil, can also be used. In addition, marine animal oil, tallows, and animal fats can also serve as starting materials for methyl esters that are to be used according to this invention.

The fats and oils which serve as starting materials can be used in random mixtures. They need not be either fresh and pure natural products, but may be used in the form of hydrogenated fats and oils or those which have been otherwise modified in the C chain. Even waste oils and waste fats, e.g., used table oils or oils used for frying, can be used as starting materials for the methyl esters that are to be used according to this invention. Thus, a further aspect of this invention is to make use of waste materials that are harmful to the environment.

DETAILED DESCRIPTION OF THE INVENTION

The invention is based on the surprising discovery that the fatty acid methyl esters which are polar solvents can surprisingly perform, in a very outstanding manner, the function of the nonpolar solvents required to date and can thus entirely or substantially replace these. Thus, it is possible for the first time to offer a solvent which can be suitably used for both components of a polyurethane binder system and which, at the same time, may make the use of nonpolar solvents, especially of high-boiling aromatic hydrocarbons completely superfluous. In view of the fact that it was so far not possible to use any of the polar solvents proposed for use in polyurethane binder systems without the addition of nonpolar solvents, this finding was not to be expected.

A 100% replacement of the high-boiling aromatics by fatty acid methyl esters is to be preferred especially for environmental protection reasons since in this case, the ecological advantages of this invention can be fully utilized. It is, however, also possible to use these methyl esters together with high-boiling hydrocarbons If this should be expedient in individual cases. If the amount of the fatty acid methyl esters exceeds the amount of the hydrocarbons, the ecological advantages of the invention are still sufficiently evident, although to a degree which gradually decreases. Overall, the Invention thus provides an environmentally compatible variant of the conventional binder/solvent systems, even when the methyl esters are used together with relatively small amounts of aromatics, said variant not being inferior to these conventional systems. It is of course also possible to use solvents containing fatty acid methyl esters and high-boiling aromatics, in which, conversely, the amount of aromatics predominates over the amount of fatty acid methyl esters, but in this case the ecological advantages of the invention are no longer sufficiently evident.

In addition, in certain cases It may be useful to also add an additive, which increases the polarity of the solvent, to the solution of the phenolic resin in the methyl ester. Suitable for this purpose are many polar components, for example a mixture of dimethyl esters of dicarboxylic acids with 4 to 6 carbon atoms, also known as "dibasic esters", abbreviated as "DBE". The use of this type of polarizing additive in no way entails a change of the basic advantages obtained when fatty acid methyl esters are used as solvents for polyurethane binder systems.

The rapeseed oil methyl ester mentioned above as a typical example of the solvents to be used according to this invention is an environmentally harmless and natural $CO_2$-neutral product. It is high-boiling and sufficiently thin-bodied, i.e., it meets the physical requirements of a solvent for polyurethane binder systems. In addition, it is also nearly odor-free and considered to be harmless with respect to emissions measured in the workplace. Furthermore, it is not classified as a combustible hazardous substance, a fact that makes transportation and storage of the solutions prepared (with this methyl ester) very easy. In addition, during casting, almost none of the undesirable gaseous breakdown products form since the numerous double bonds (rapeseed oil contains predominantly mono- und poly-unsaturated fatty acids) react to form solid compounds which do not evolve gas. When rapeseed oil methyl esters are used as the solvent, the maximum permissible exposure limits are not even approached. Furthermore, rapeseed oil methyl ester has an excellent release effect and thus facilitates the removal of cores and molds, which obviates the use of additional release agents.

The same applies to the other fatty acid methyl esters and fatty acid methyl ester mixtures. Due to its easy processibility, the methyl ester of soybean oil deserves special mention. Particularly satisfactory results were obtained with the methyl ester of linseed oil—in some cases even better than with rapeseed methyl ester. Castor oil methyl ester is a particularly suitable solvent for phenol resin but, due to its content of OH groups, It is less satisfactory for polyisocyanates and, on the other hand, has the advantage that, owing to these OH groups, it is incorporated in the polyurethane. Other methyl esters are listed in Table I.

TABLE I

| Fatty acid methyl esters | | |
|---|---|---|
| | Melting point [° C.] | Boiling point [° C.] |
| Methyl palmitate | 29.5 | 129–133 |
| Methyl stearate | 38.5 | 443 (at 747 Torr) |
| Methyl laurate | 4 | 261–262 |
| Methyl oleate | −19 | 215–216 (at 15 Torr) |
| Sorbic acid methyl ester | 5 | 170 |
| Linoleic acid methyl ester | −35 | 207–208 (at 11 Torr) |
| Linolenic acid methyl ester | | 207 (at 14 Torr) |
| Methyl arachidate | 46–47 | 215–216 (at 10 Torr) |
| Behenic acid methyl ester | 53–54 | 224 (at 20 hPa) |

The following examples will explain the invention without restricting its scope. The quantities in the examples are designated as "pbw" which means parts by weight. Trade names are identified by "$^{(T)}$".

In the examples, the invention is explained in the preferred embodiment in which the high-boiling aromatics have been completely replaced by fatty acid methyl esters and is compared with results which are obtained with the use of conventional solvents. When the fatty acid methyl esters were used together with high-boiling aromatics as solvents, the results fall in the range between the results indicated below as "according to this invention" and those indicated below as "conventional solution for comparison purposes".

EXAMPLE 1

Preparation of a phenolic resin (precondensate)

385.0 pbw of phenol 176.0 pbw paraformaldehyde, and 1.1 pbw zinc acetate were placed into a reaction vessel which was equipped with a cooler, a thermometer, and a stirrer. The cooler was set to reflux. The temperature was allowed to rise continuously to 105° C. within one hour and was subsequently maintained at his temperature for two to three hours until a refractive index of 1.590 was reached. Subsequently, the cooler was set to atmospheric distillation, and the temperature was increased to 125° C.–126° C. within one hour until a refractive index of approximately 1.593 was reached. This was followed by vacuum distillation until a refractive index of 1.612 was reached. The yield was 82–83% of the raw materials used.

This phenolic resin was used to produce test specimens according to the cold box process (Example 2) and test specimens according to the no-bake process (Example 3).

EXAMPLE 2

Cold box process

After reaching the desired value, the phenolic resin according to Example 1 was used to prepare solutions which had the following composition:

According to this invention ("resin solution 2E")
  100.0 pbw of phenolic resin according to Example 1
  54.5 pbw of rapeseed oil methyl ester, and
  27.3 pbw of DBE$^{(T)}$ (mixture of dimethyl esters of dicarboxylic acids with 4 to 6 carbon atoms)
  0.3% aminosilane oder amidosilane Conventional solution for comparison purposes ("resin solution 2V")
  100.0 pbw of phenolic resin according to Example 1
  20.0 pbw isophorone (cyclic ketyna)
  23.0 pbw triacetin (glyceryl triacatate)
  40.0 pbw of solvesso 150$^{(T)}$ (mixture of aromatic hydrocarbon s with 10–13 carbon atoms
  16.7 pbw Plastomoll DOA$^{(T)}$ (dioctyl adipate)

In addition, the following polyisocyanate solutions were prepared:

According to this invention ("activator 2E")
  80–85 pbw dphenylmethanediisocyanate (MDI, technical grade)
  15–20 pbw rapeseed oil methyl ester, and
  0.2 pbw of acid chloride Conventional solution for comparison purposes: ("activator 2V")
  77.5 pbw diphenylmethanediisocyanate (MDI, technical grade)
  19.0 pbw Shellsol R$^{(T)}$ (mixture of hydrocarbons containing 85% of aromatic hydrocarbons)
  3.0 pbw Essovarsol 60$^{(T)}$ (aliphatic adcycloaliphatic hydrocarbons)
  0.3 pbw acid chloride
  0.3 pbw silane.

Subsequently, the molding material mixtures were prepared by intimately mixing quartz sand, resin solution, and activator in a vibratory mixer. These mixtures were used to produce test specimens at a shot pressure of 4 bar (+GF+ bars) which were subsequently gassed for 10 sec with dimethylisopropylamine at a gassing pressure of 4 bar and next for 10 sec with air. The mixtures had the following composition:

According to this invention ("Cores 2E")
  100.0 pbw quartz sand H32
  0.8 pbw resin solution 2E, and
  0.8 pbw activator 2E Conventional mixture for comparison purposes ("Cores 2V")
  100.0 pbw quartz sand H32
  0.8 pbw resin solution 2V, and
  0.8 pbw activator 2V Subsequently, the flexural strength of the test specimens obtained in this manner was determined using the GF method. In Table II, the flexural strength of cores 2E and of cores 2V are compared. The same tests were carried out first using a mixture from which test specimens were produced immediately after mixing was concluded and next (to assess the so-called "sand life") with a mixture that was first stored for 1 hour and then processed into test specimens. The flexural strength was assessed immediately after gassing (initial strength) and 1 and 24 hours after gassing (final strength).

TABLE II

| | Flexural strength in N/cm$^2$ | | | | | |
|---|---|---|---|---|---|---|
| Mixture | processed immediately | | | processed after 1 hour | | |
| Test | immediately | 1 h | 24 h | immediately | 1 h | 24 h |
| Cores 2E | 240 | 500 | 570 | 220 | 500 | 600 |
| Cores 2V | 290 | 520 | 580 | 270 | 480 | 540 |

Table III illustrates several performance properties of cores 2E in comparison with cores 2V. Six different test series were carried out, such as:

Test series 1: The cores were stored for 1 day in the laboratory, immersed in water sizing on the following day, air-dried, and tested after 1 and 2 days.

Test series 2: The cores were immersed in water sizing, air-dried, and tested after 1 and 2 days.

Test series 3: The cores were stored for 1 day in the laboratory, immersed in water sizing on the following day, dried for 1 hour in the oven at 150° C., and tested after chilling (*).

Test series 4: The cores were immersed in water sizing, dried for 1 hour in the oven at 150° C., and tested after chilling (*).

Test series 5: The cores were stored for 1 day in the laboratory, stored on the following day at a relative humidity of 100%, and tested after 1 and 2 days.

Test series 6: The cores were stored at a relative humidity of 100%; and tested after 1 and 2 days.

TABLE III

| | Flexural strength in N/cm$^2$ | | | | | | | | | |
|---|---|---|---|---|---|---|---|---|---|---|
| Test series | 1 | | 2 | | 3 | 4 | 5 | | 6 | |
| Testing time (days) | 1 | 2 | 1 | 2 | * | * | 1 | 2 | 1 | 2 |
| Cores 2E | 540 | 560 | 550 | 540 | 550 | 550 | 500 | 520 | 490 | 500 |
| Cores 2V | 530 | 520 | 560 | 560 | 550 | 580 | 480 | 490 | 500 | 510 |

Tables II and III show that in all cases, the cores which were produced according to this invention have practically the same flexural strength as the cores that were produced using the conventional method. The important difference is that there is no longer a noticeable contamination of the working place when cores 2E are produced and cast. The properties during casting were confirmed by specimens cast in the laboratory.

EXAMPLE 3

No-bake-process

Following the instructions in Example 1, resin solutions with the following composition were prepared from the phenolic resin:

According to the invention ("resin solution 3E")
    58 pbw phenolic resin
    14 pbw rapeseed oil methyl ester, and
    28 pbw of DBE$^{(T)}$ Conventional mixture for comparison purposes ("resin solution 3V")
    58 pbw of phenolic resin
    28 pbw of DBE$^{(T)}$
    14 pbw of Hydrosol AFO$^{(T)}$ (mixture of high-boiling aromatic hydrocarbons)

The polyisocyanate solutions used for the no-bake process had the following composition:

According to this invention ("activator 3E")
    85 pbw of diphenylmethanediisocyanate
    15 pbw of rapeseed oil methyl ester Conventional mixture for comparison our doses ("activator 3V")
    70 pbw of diphenylmethanediisocyanate
    30 pbw of Hydrosol AFD$^{(T)}$ Subsequently, molding material mixtures of the following composition were prepared in a vibratory mixer:

According to this invention ("mixture 3E")
    100.0 pbw of quartz sand H32
    0.9 pbw of resin solution 3E
    0.9 pbw of activator 3E
    2.0% of phenylpropylpyridine (percent relative to the resin solution)

Conventional mixture for comparison purposes ("mixture 3V")
    100.0 pbw of quartz sand H32
    0.9 pbw of resin solution 3V
    0.9 pbw of activator 3V
    2.0% of phenylpropylpyridine (percent relative to the resin solution)

These mixtures are tamped into molds and allowed to cure. Both mixtures were set after 2 min and cured after 3 min. After 1 hour, 2 hours, and 24 hours, the flexural strength of the cured mixtures were determined. The flexural strength of the mixture according to this invention is invariably superior to that of the conventional mixture. As to the contamination of the working place, the statements in Example 2 also apply here.

TABLE IV

| | Flexural strength in N/cm$^2$ | | |
|---|---|---|---|
| Test after | 1 h | 2 h | 3 h |
| Mixture 3E | 230 | 320 | 380 |
| Mixture 3V | 170 | 220 | 270 |

What is claimed is:

1. A two-component polyurethane-based binder system for casting molding materials consisting essentially of:
    (a) a phenolic resin component consisting essentially of at least (i) one phenolic resin exhibiting free phenolic and free alcoholic OH-groups and (ii) a solvent for the phenolic resin, said phenolic resin being the condensation product of a phenol with a formaldehyde component prepared in the presence of catalytic concentrations of zinc ions; and
    (b) a polyisocyanate component consisting essentially of (i) at least one polyisocyanate capable of reacting with said phenolic resin exhibiting free phenolic and free alcoholic OH-groups to form a resin therewith and (ii) a solvent for said polyisocyanate;
    wherein said solvent (b) (ii) for said polyisocyanate is comprised at least in part of a fatty acid methyl ester, wherein said fatty acid methyl ester is a methyl monoester of one or more fatty acids with a carbon chain of twelve or more carbon atoms, and wherein said solvent (b) (ii) for said polyisocyanate contains more fatty acid methyl ester than high-boiling aromatic hydrocarbon.

2. A two-component polyurethane-based binder system as in claim 1, wherein said phenolic resin is prepared in the presence of zinc acetate.

\* \* \* \* \*